United States Patent [19]
Doutre et al.

[11] Patent Number: 6,086,688
[45] Date of Patent: Jul. 11, 2000

[54] CAST METAL-MATRIX COMPOSITE MATERIAL AND ITS USE

[75] Inventors: Don Allen Doutre; Iljoon Jin, both of Kingston; David James Lloyd, Bath, all of Canada

[73] Assignee: Alcan International Ltd., Montreal, Canada

[21] Appl. No.: 08/901,800

[22] Filed: Jul. 28, 1997

[51] Int. Cl.$^7$ .............................. C22C 21/00; F16D 65/10
[52] U.S. Cl. ........................ 148/437; 148/440; 428/614; 428/650; 188/218 XL
[58] Field of Search .................................. 148/437–440; 428/614, 650; 188/218 R, 218 XL

[56] References Cited

U.S. PATENT DOCUMENTS

| | | |
|---|---|---|
| 3,239,319 | 3/1966 | Pollard . |
| 3,885,959 | 5/1975 | Badia et al. . |
| 3,951,651 | 4/1976 | Mehrabian et al. . |
| 4,450,207 | 5/1984 | Donomoto et al. ............... 428/614 |
| 4,650,552 | 3/1987 | deNora et al. .................... 252/512 |
| 4,932,099 | 6/1990 | Corwin ............................ 164/97 |
| 4,943,490 | 7/1990 | Broski et al. .................... 428/614 |
| 4,959,276 | 9/1990 | Hagiwara et al. ................ 428/614 |
| 4,963,439 | 10/1990 | Yamamoto et al. .............. 428/614 |
| 4,980,242 | 12/1990 | Yamamoto et al. .............. 428/614 |
| 5,028,494 | 7/1991 | Tsujimura et al. ............... 428/614 |
| 5,172,746 | 12/1992 | Corwin ............................ 164/97 |
| 5,255,433 | 10/1993 | Jin et al. ......................... 164/97 |
| 5,301,738 | 4/1994 | Newkirk et al. ................. 164/97 |
| 5,325,941 | 7/1994 | Parinacci et al. ........... 188/218 XL |
| 5,449,421 | 9/1995 | Hamajima et al. .............. 428/614 |
| 5,523,050 | 6/1996 | Lloyd et al. ..................... 148/437 |
| 5,620,791 | 4/1997 | Dwivedi et al. ................. 428/323 |

FOREIGN PATENT DOCUMENTS

| | | |
|---|---|---|
| 52-48504 | 4/1977 | Japan . |
| 58-93834 | 6/1983 | Japan . |
| 59-172234 | 10/1984 | Japan . |
| 62-124245 | 6/1987 | Japan . |
| 64-87732 | 3/1989 | Japan . |
| 1-230735 | 9/1989 | Japan . |
| 3-86387 | 4/1991 | Japan . |
| 5-117823 | 5/1993 | Japan . |
| 5-240277 | 9/1993 | Japan . |
| 2112812A | 7/1983 | United Kingdom . |
| WO 92/09711 | 6/1992 | WIPO . |

OTHER PUBLICATIONS

Registration Record of International Alloy Designations and Chemical Composition Limits for Wrought Aluminum and Wrought Aluminum Alloys, The Aluminum Association, Washington DC, Feb. 1989.

PCT Search Report for PCT/CA98/00728, 4 pages, Oct. 30, 1998.

Primary Examiner—George Wyszomierski
Attorney, Agent, or Firm—Gregory Garmong

[57] ABSTRACT

A metal-matrix composite material includes a matrix having magnesium in an amount of more than about 0.3 weight percent but no more than about 2.5 weight percent, an alloying element of about 0.8 to about 2.5 weight percent iron or from about 1.0 to about 2.5 weight percent manganese, and the balance aluminum and impurities. Dispersed throughout the matrix is a plurality of metal oxide particles present in an amount of more than about 5 volume percent but no more than about 25 volume percent of the total volume of the matrix and the particles. This material may be cast into casting molds. After casting is complete and during solidification of the matrix alloy, a high volume fraction of intermetallic particles is crystallized in the matrix alloy. The total of the volume fractions of the metal oxide particles and the intermetallic particles is from about 10 to about 40 volume percent, preferably from about 25 to about 40 volume percent.

23 Claims, 5 Drawing Sheets

CAST METAL-MATRIX COMPOSITE MATERIAL AND ITS USE

BACKGROUND OF THE INVENTION

This invention relates to cast metal-matrix composite materials, and associated casting procedures and products made with the composite materials.

Metal-matrix composite materials have reinforcement in the form of fibers, whiskers, particles, or the like, embedded in a solid metallic matrix. The reinforcement imparts excellent mechanical properties to the composite material, while the metal matrix holds the reinforcement in the desired shape and form and protects it from external damage. The matrix also imparts important physical properties to the composite material such as good thermal conductivity and selected surface properties.

There are two principal techniques for preparing articles from the metal-matrix composite materials. In a casting technique, a homogeneous mixture of the solid reinforcement and the molten matrix material is prepared and then poured into a mold, where the molten matrix material solidifies. In an infiltration technique, the solid reinforcement is prepositioned in a container such as a mold, and the molten matrix material is forced or drawn into the container, where it solidifies. The casting technique is typically better suited for preparing composite materials with a relatively lower volume fraction of the reinforcement, and the infiltration technique is better suited for preparing composite materials with a relatively higher volume fraction of the reinforcement. However, in a further step the infiltrated material may be diluted by the addition of extra molten matrix metal to reach a lower volume fraction of reinforcement, so that the combination of infiltration and dilution permits the production of composite materials of low-to-medium volume fractions of reinforcement.

It is often difficult to prepare articles or products from the composite materials having high volume fractions of reinforcement by casting because, in the casting of many intricate parts, the mixture of molten metal and reinforcement particles must flow along channels in the interior of the mold. If the volume fraction of reinforcement particles is too high, the mixture of reinforcement particles and molten metal becomes too viscous to flow in the small channels or flows only very slowly. The result is that the molten metal may freeze before the channels are filled. Consequently, the mold is not fully filled and the desired article is never properly formed.

This casting problem is more acute for some types of commercially important reinforcement particles than for others. Although for some purposes different types of reinforcing particles are substantially identical, that is not the case in respect to the castability of the metal-matrix composite materials containing such particles. For example, metal-matrix composite materials having an aluminum alloy matrix and up to about 30 volume percent of silicon carbide reinforcement particles may be cast into articles with fine features. The maximum practical limit for the casting of similar products from composite materials having an aluminum alloy matrix and aluminum oxide particles is about 20–25 volume percent of aluminum oxide. These different limitations arise because of both the nature of the particles themselves and the types of matrix alloys that must be used to achieve stability and other features of the final composite material. The inability to achieve cast composite materials with higher volume fractions of aluminum oxide and other metal oxides prevents their use in important products.

Because casting of articles offers many other advantages over production of articles by infiltration, it would be desirable to find an approach whereby articles of difficult-to-cast compositions such as aluminum alloy/metal oxide reinforcement could be cast in higher volume fractions of reinforcing particulate than heretofore possible. The present invention fulfills this need, and further provides related advantages.

SUMMARY OF THE INVENTION

The present invention provides a metal-matrix composite material, a method of casting articles made with the metal-matrix composite material, and cast articles made of the metal-matrix composite material. The invention provides an approach for increasing the maximum operable effective particulate volume fraction that may be cast for aluminum alloy/metal oxide composite materials. The conventional approach limits the final cast article to a maximum of about 20–25 volume percent of metal oxide particles, but with the present approach compositions with up to about 40 volume percent of particles in the final cast article may be prepared. The present approach may be practiced using otherwise-conventional casting and foundry equipment.

In accordance with the invention, a method of preparing a cast article comprises the steps of providing a casting mold, and preparing in a first container a substantially homogenous mixture of a molten alloy having a composition operable to crystallize an intermetallic phase upon solidification, and a plurality of solid metal oxide particles dispersed in the molten alloy. The plurality of solid metal oxide particles comprises from about 5 to about 25 volume percent of the molten mixture. The casting method includes transferring the molten mixture from the first container into the casting mold, and solidifying the molten mixture in the casting mold to form a solidified mixture containing solid intermetallic-phase particles and solid metal oxide particles in a total amount of at least about 25 volume percent, and preferably from about 25 to about 40 volume percent, of the solidified mixture.

Higher volume fractions of particulate in the cast product are reached by supplying the particulate from two distinct sources. The first source is the solid metal oxide that is mixed with the molten metal initially. This first source may comprise up to about 25 volume percent of the final solidified mixture that forms the cast article. Higher volume fractions of the metal oxide particles cannot be cast into molds with fine-scale passageways. The second source is intermetallic particles that are not present in the molten metal, but which form after the molten metal/metal oxide mixture has flowed through the passageways, as the molten metal solidifies. Because the intermetallic particles are not present in the molten metal, they cannot reduce its fluidity during casting to prevent casting into small mold passageways. The intermetallic particles form only during solidification, after the molten mixture has reached its final position in the mold, and increase the volume fraction of particulate to the range of from about 25 to about 40 volume percent. That is, neither source of particles would itself be sufficient to provide the desired volume fraction range of particles, but together the two sources do provide the necessary volume fraction of particulate.

This approach may be used in any operable casting process, such as gravity, investment, or pressure-die casting. It may be used to make any operable product, but it yields its greatest benefits when the product has intricate features that necessitate the use of fine-scale passageways in the mold cavity. For example, the present approach may be used to cast solid disk-brake rotors, but its greatest advantage comes in casting vented disk-brake rotors where the ribs between individual vents are defined by narrow passageways in the mold. If the conventional approach is used and the metal oxide in the mixture being cast exceeds about 25 volume percent, the mixture of molten metal and reinforcement tends to freeze before it can flow the entire length of the mold passageways that define the ribs. With the present approach, much higher volume fractions of particulate are achieved in the cast product than would otherwise be possible.

The present approach is preferably practiced with an aluminum matrix alloy having magnesium in an amount of from about 0.3 to about 2.5 weight percent and an alloying element selected from the group consisting of iron, manganese, and combinations thereof, balance aluminum and impurities. The iron and manganese are present in amounts of, in weight percent, from about 0.8 to about 2.5 percent iron and from about 1.0 to about 2.5 percent manganese. This alloy must be operable to crystallize from about 3 to about 20 volume percent (of the total solid material) of intermetallic compounds during solidification to provide the second source of the reinforcement particulate. Other alloying elements may be present, such as, for example, from about 0.8 to about 4.0 weight percent nickel, more than zero but no more than about 0.3 weight percent vanadium, more than zero but no more than about 0.2 weight percent titanium, more than zero but no more than about 1.7 weight percent cobalt, and/or more than zero but no more than about 0.45 weight percent chromium. The matrix alloy preferably has less than about 1.2 percent by weight silicon, less than about 0.5 percent by weight copper, and less than about 0.5 percent zinc.

The selected composition of the aluminum matrix alloy is preferably a eutectic or hypereutectic composition, collectively termed herein a "non-hypoeutectic composition". Such non-hypoeutectic compositions produce large volume fractions of intermetallic particles by crystallization from the liquid phase during cooling which, taken with the volume fraction of metal oxide particles, together achieve the desired mechanical properties. If the composition is a hypoeutectic composition, a low volume fraction of such crystals is formed, and the volume fraction of the intermetallic particles, when taken with the volume fraction of the metal oxide reinforcement, is insufficient to achieve the desired mechanical properties.

These compositions have a high solidus temperature, typically about 630° C. or greater, preferably about 640° C. or greater. This high temperature allows the cast product to be used at relatively high temperatures, an important advantage for many articles and applications.

The metal oxide that provides the first source of the reinforcement particulate is preferably aluminum oxide particles, typically in a size range of from about 5 to about 25 micrometers. Other operable metal oxides such as magnesium oxide and magnesium/aluminum spinels may be used as well.

The present invention provides an approach by which articles may be cast from a composite material having an aluminum alloy matrix with metal oxide reinforcement particles and intermetallic particles as well. The volume fraction of the two types of particles, taken together, is in the range of about 25 to about 40 volume percent, sufficiently high to achieve excellent mechanical properties. These properties are retained to high temperatures due to the high solidus temperature of the preferred aluminum matrix alloys. The present invention may also be used to form composite materials having less than 25 volume percent of particles, such as from about 10 to about 25 volume percent particles, but the advantages of manufacturing such articles by the present invention are much less.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
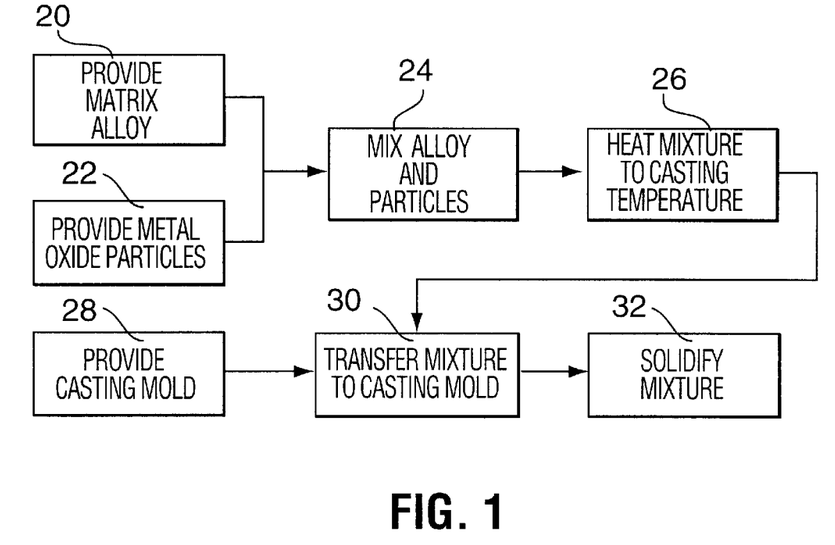
FIG. 1 is a block diagram of a preferred approach for casting articles from the metal matrix composite, according to the present invention.

FIG. 1 is a block diagram of a preferred approach for preparing the metal-matrix composite material and for practicing the casting process of the invention. A source of a matrix alloy is provided, numeral 20. The matrix alloy is an aluminum-magnesium base alloy having a composition which, upon solidification, produces a high volume fraction of intermetallic crystallized particles and which has a relatively high solidus temperature and relatively low liquidus temperature. A preferred such matrix alloy includes magnesium in an amount of more than about 0.3 weight percent but no more than about 2.5 weight percent. If less than about 0.3 weight percent magnesium is present, the preferred aluminum oxide reinforcement is poorly wetted by the metallic phase, and mixing and casting are difficult. If more than about 2.5 weight magnesium is present, the solidus temperature falls below the desired minimum value of about 630° C. Most preferably, the magnesium content is from about 0.6 weight percent to about 2.2 weight percent. The matrix alloy includes a further alloying element. The further alloying element is from about 0.8 to about 2.5 percent iron and/or from about 1.0 to about 2.5 percent manganese. If less than the indicated amount of iron and/or manganese is present, an insufficient volume fraction of intermetallic particles is formed upon solidification. If more than the indicated amount of iron or manganese is present, the liquidus temperature becomes too high for castability. The balance of the matrix alloy is aluminum and typical impurities found in commercial aluminum alloys.

Optionally, there may be present additional alloying elements that aid in forming the large volume fraction of crystallized particles. Where used, these additional alloying element may be, for example, from about 0.8 to about 4.0 percent nickel, more than zero but no more than about 0.3 percent vanadium, more than zero but no more than about 0.2 percent titanium, more than zero but no more than about 1.7 percent cobalt, and/or more than zero but no more than about 0.45 percent chromium. If more than the indicated amount of nickel is present, the matrix tends to be brittle. If more than the indicated upper limit of the vanadium, titanium, cobalt, or chromium is present, the liquidus temperature becomes too high for castability.

Preferably, the matrix alloy comprises less than about 1.2 percent by weight silicon, less than about 0.5 percent by weight copper, and less than about 0.5 percent by weight zinc. If more than these amounts of silicon, copper, and/or zinc are present, the solidus temperature of the matrix is reduced to too low a temperature. Furthermore, if more than the upper limits or copper and zinc are present, the matrix alloy becomes too hard at room temperature, which, when combined with the intermetallics present, makes the alloy too brittle.

Two preferred matrix alloys are (1) an alloy wherein the matrix comprises about 1 percent magnesium, no more than about 0.6 percent silicon, no more than about 0.25 percent copper, no more than about 0.2 percent chromium, about 2 percent iron, about 2 percent manganese, and about 2 percent nickel, balance aluminum and incidental impurities, and (2) an alloy wherein the matrix comprises about 1 percent magnesium, no more than about 0.6 percent silicon, no more than about 0.25 percent copper, no more than about 0.2 percent chromium, about 2 percent iron, and about 2.5 percent manganese, balance aluminum and incidental impurities.

Where the composite material is used for casting of an article such as the vented disk-brake rotor, the alloying elements are selected so that the solidus temperature of the matrix alloy is relatively high and the liquidus temperature is relatively low. The solidus temperature is relatively high, preferably at least about 630° C. and most preferably at least about 640° C., so that the maximum operating temperature of a cast article containing the matrix alloy is relatively high. In a vented disk-brake rotor, the maximum operating temperature must be relatively high in order to prevent partial melting of the rotor in conditions of extreme use. As noted, some alloying elements are limited in order to meet this requirement of a relatively high solidus temperature. The liquidus temperature, on the other hand, is relatively low, preferably no more than about 750° C. During subsequent melting and casting operations, the matrix alloy must be superheated such that it always above the liquidus temperature prior to the point that it reaches its final location within the casting mold. If it falls below the liquidus temperature, intermetallic particles begin to form which reduce the fluidity of the matrix alloy and increase the likelihood of premature freezing in the mold passageways.

The alloying elements are also preferably selected so that the composition of the aluminum alloy matrix prior to solidification is a non-hypoeutectic composition or, equivalently stated, a eutectic or hypereutectic composition. These preferred compositions produce large volume fractions of intermetallic particles by crystallization from the liquid phase during cooling. The total of the volume fraction of the intermetallic particles produced by crystallization plus volume fraction of the metal oxide particles present in the molten matrix alloy achieve the desired mechanical properties in the final cast product. If the composition is a hypoeutectic composition, a lower volume fraction of such crystals is formed, and the volume fraction of the intermetallic particles, when taken with the volume fraction of the metal oxide reinforcement, is insufficient to achieve the desired mechanical properties.

The matrix alloy is subsequently melted. It may therefore be furnished in any meltable form, such as pigs, foundry ingot, pieces of metal, or the like. The matrix alloy may be wholly or partially prealloyed, which is preferred, or provided in elemental form and alloyed during the casting operation to be described subsequently.

Returning to the depicted casting method depicted in FIG. 1, a source of a metal oxide reinforcement, preferably in the form of particles, is provided, numeral 22. The metal oxide is preferably aluminum oxide, but other metal oxides such as magnesium oxide and aluminum-magnesium spinels may also be used. The metal oxide particles are preferably equiaxed or are elongated with an aspect ratio of from about 1 to about 3. The metal oxide particles are preferably not more greatly elongated so as to resemble short fibers or chopped whiskers, because the more elongated particles are more difficult to cast. The metal oxide particles preferably have a maximum dimension of from about 5 to about 25 micrometers. Particles with sizes less than about 5 micrometers create mixtures of high viscosity that becomes difficult to cast. Particles with sizes greater than about 25 micrometers settle from the molten mixture before solidification, causing non-uniform distributions, and also adversely affect the machining of the final articles. However, in some circumstances more elongated, larger, or smaller particles may be used.

The metal oxide particles are provided in an amount such that, when mixed with the matrix alloy, the metal oxide particles constitute from about 5 to about 25 volume percent of the total of the matrix alloy and the metal oxide particles. Lesser volume fractions of metal oxide particles give no practical benefit in terms of final properties of the article. Higher volume fractions of metal oxide particles lead to molten mixtures which cannot be cast sufficiently well, as will be discussed subsequently.

The matrix alloy and the metal oxide reinforcement material are mixed together to form a homogeneous melt to which nothing further need be added, step number 24, and heated to a casting temperature greater than the liquidus temperature of the matrix alloy, step number 26. The matrix alloy and metal oxide particles may be combined in their entirety by mixing, such as by melting the matrix alloy and gradually adding and stirring in the metal oxide particles. Equivalently for the present purposes, a portion of the matrix alloy material may be combined with the metal oxide by pressure, vacuum, or reactive infiltration to form a precursor which is then diluted with the rest of the matrix alloy to form a castable composition. The resulting mixture is termed a "molten mixture", although only the matrix alloy is melted and the reinforcing particles remain solid and are dispersed throughout the melt. The mixing, step 24, and the heating, step 26 may be performed sequentially in either order or simultaneously. That is, the matrix alloy and the particles may be mixed together and then heated, they may be heated and then mixed together, or the matrix alloy may be heated and the particles thereafter added to it.

Figure 2:
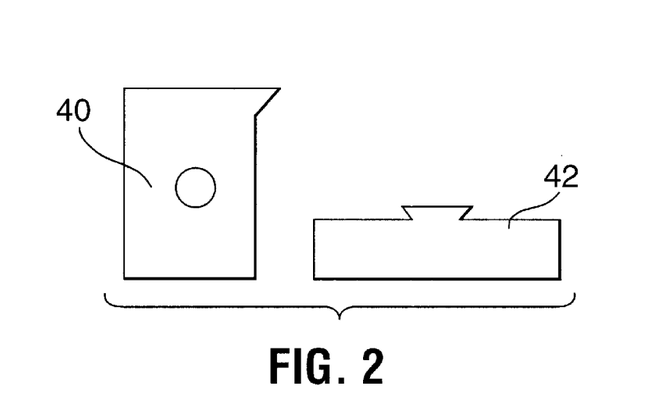
FIG. 2 is a schematic illustration of a casting apparatus.

The mixing step 24 and the heating step 26 are normally performed in a mixing vessel 40 such as depicted in FIG. 2. A separate casting mold 42 is provided, numeral 28 of FIG. 1. The mixing vessel 40 is depicted schematically as a top-pour crucible, but any other operable type of mixing vessel 40 such as a bottom-pour vessel or otherwise may be used. Details of the melting are known in the art, such as melting practices, filtering, and the like, all of which are applicable hereto.

The casting mold may be of any type known in the art. In general, however, it is a hollow body, which may be a sand mold or a metal mold, depending upon the type of casting technique being used. The interior of the mold, termed the mold cavity, is shaped to define the shape of the final article to be produced, or nearly the final shape, to allow for final machining. The interior shape therefore depends upon the nature of the final article. At least a part of the mold is preferably insulated so that the molten mixture retains its temperature above the liquidus temperature until it has flowed through the interior of the mold to its final location, at which time it solidifies.

Figure 3:
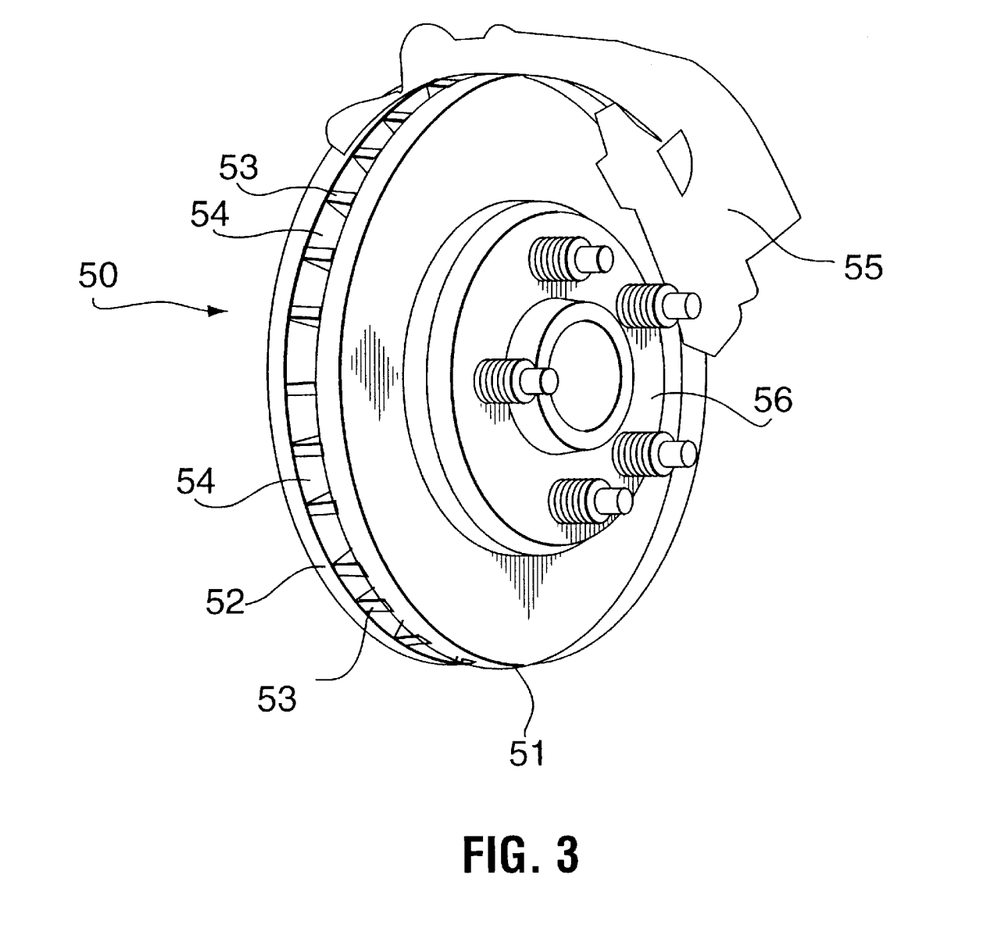
FIG. 3 is a perspective view of a vented disk-brake rotor made by the approach of the invention.

The cast article of most interest to the inventors is a cast vented disk-brake rotor 50, as shown in FIG. 3. The rotor 50 is a generally disk-shaped article having two plates 51 and 52 spaced apart by a series of thin members 53 that create air passages 54 defined by the plates 51 and 52 and laterally adjacent members 53. The air passages 54 ventilate and cool the brake disk during braking. The braking action is provided by a caliper/brake pad assembly 55 which acts against the outer surfaces of the two plates. A mounting hub 56 is also provided. The mounting hub 56, the plates 51 and 52, and the thin members 53 form an integral unit that are cast as a single piece. Typically, for automotive passenger car applications, the disk rotor 50 is about 250–350 millimeters in diameter. In such a typical rotor 50, there are approximately 40 thin members 53, each having a thickness of about 5 millimeters, separating the two plates 51 and 52.

Figure 4:
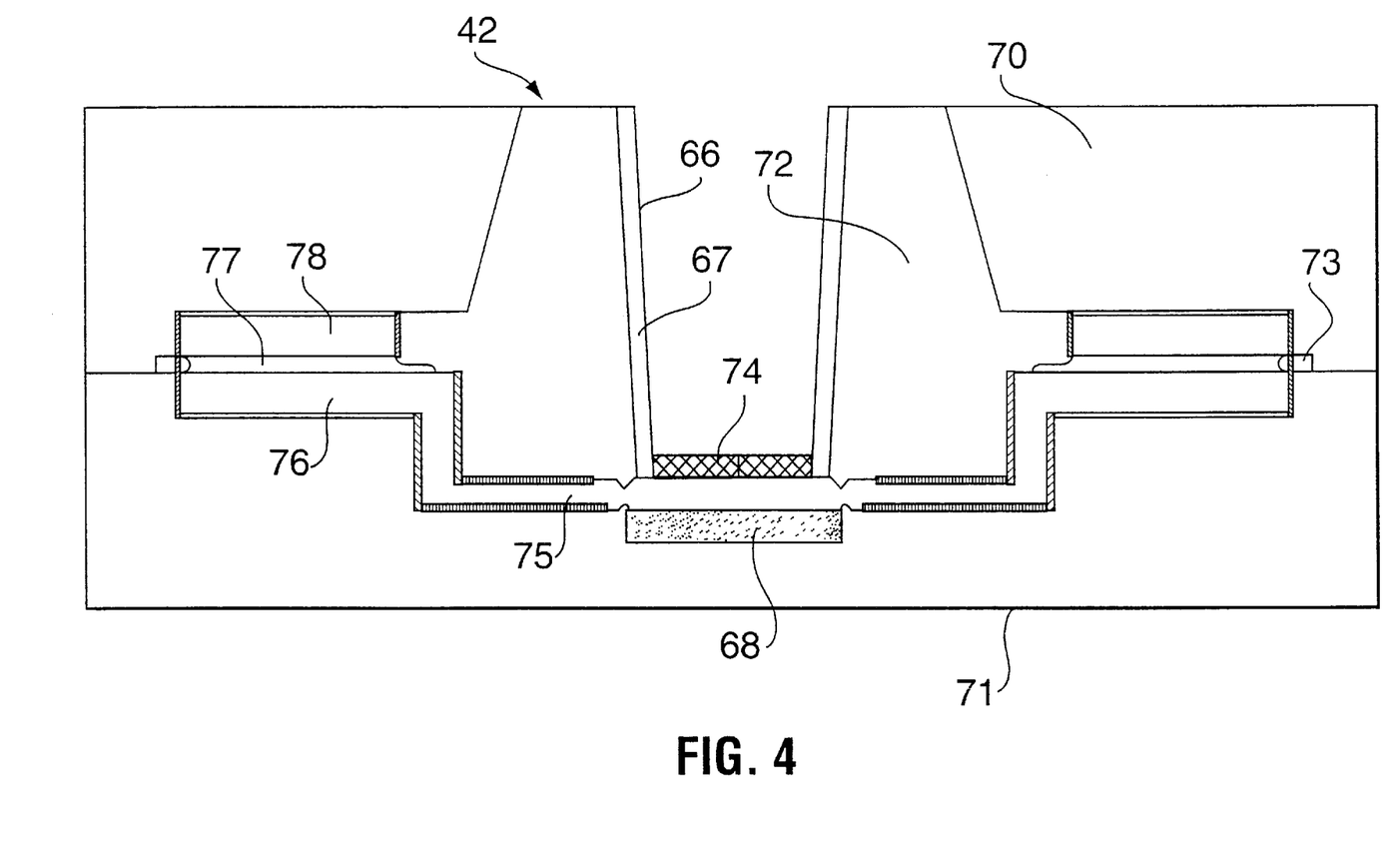
FIG. 4 is a sectional view of a casting mold used to make the vented disk brake rotor of FIG. 3.

The specific design of the casting mold 42 is known in the art for each article to be cast, and the specific mold design does not form a part of the present invention. FIG. 4 illustrates a typical casting mold 42 which is suitable to form the preferred vented disk-brake rotor 50 of the present invention. The mold 42 illustrated in FIG. 4 is of the sand mold type used in gravity casting. It includes a cope 70 and drag 71 formed in bonded sand, which together contain the mold cavity. A sand core 72 is also provided, which fits within the mold cavity and, with the cope 70 and the drag 71, cooperatively defines the shape of the cast article. The sand core 72 includes sections 73 which extend out to define the two plate members of the rotor of FIG. 3 and the thin members 53 separating them. In the center of the core 72, an insulated filling sprue 66, having insulation 67 on its sidewalls, is provided with a filter 74 mounted in its lower end. A layer of insulation 68 is positioned immediately below the sprue 66 in order to further insulate the molten mixture as it flows through the sprue 66. The insulation 67 and 68 aids in maintaining the molten mixture in the sprue 66 during casting above the liquidus of the matrix alloy until the molten mixture has flowed through the passageways in the mold to its final location, so that premature freezing does not occur.

The casting is formed by pouring molten composite material from an insulated pouring basin (not shown) into the sprue 66 from which it flows through the filter 74, into the section 75 which defines the mounting plate in the finished brake, into one of the two plates 76 in the article, and thence, via the approximately 40 thin sections 77 to fill the second of the two plates 78. One feature of complex casting molds such as those used for vented rotors 50 is the presence of the thin sections 77, which must be uniformly and completely filled by the molten composite material. The molten mixture must flow from the filter 74 via these thin sections to fill the additional plate section 78 before solidifying, so that the run is filled and the final cast article is sound.

The filling of long runs with this cross section is a particular problem for the casting of conventional metal-matrix composite materials with metal oxide reinforcing particles present in volume factions of greater than about 20–25 volume percent of the total of metal matrix and reinforcing particles. The presence of higher volume fractions of metal oxide particles tends to increase the viscosity (i.e., reduce the fluidity) of the molten mixture of matrix alloy and particles to an extent that the mixture cannot flow along the length of long runs 78 before the matrix alloy begins to freeze. Once that freezing occurs, the molten mixture flows very little, if any, further, and the run and the casting mold are not properly filled. The result is an unsound, unsatisfactory final article.

Higher volume fractions of particles are required for some applications such as the cast ventilated disk-brake rotor in order to achieve satisfactory mechanical properties. The limitation of a practical maximum of about 20–25 volume percent of cast metal oxide particles prevents aluminum matrix/metal oxide particles composite materials from being a contender for use in these applications. Many attempts have been made to solve this problem so that higher volume fractions of metal oxide particles may be used, such as selecting special matrix alloys and selecting special types of metal oxide particles, but none have heretofore been successful.

Although for many purposes all types of reinforcing particles are treated as equivalent, for the purposes of castability they are not equivalent. For example, the casting of metal-matrix composites containing silicon carbide reinforcing particles is much less prone to this problem for a number of reasons, and such composites containing up to about 30 volume percent may be cast. The metal oxide particles, such as the preferred aluminum oxide particles, thus behave differently in casting procedures than do other types of reinforcing particles.

In the present approach, the heated and molten mixture of step 26 is transferred to the casting mold 42 provided in step 28, see step number 30 of FIG. 1. This transferring is usually termed "casting". The homogeneous molten mixture is prepared in the mixing vessel 40 and transferred to the casting mold 42.

Figure 5:
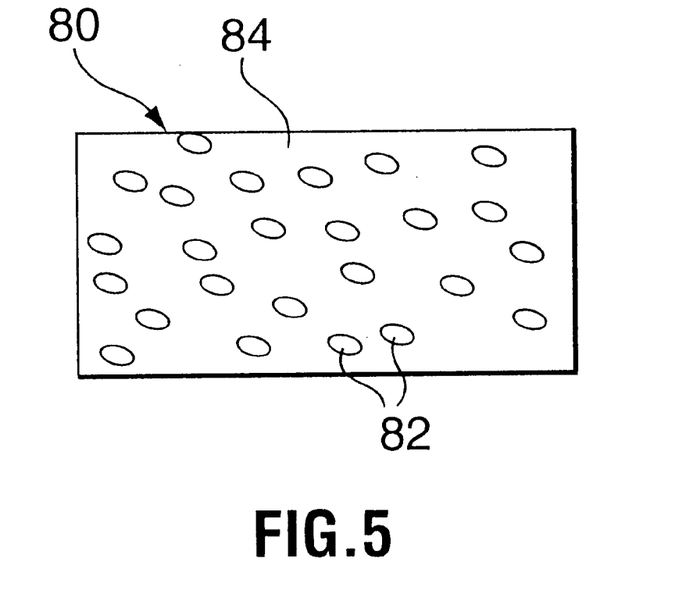
FIG. 5 is an idealized sectional view of a molten mixture of a molten matrix alloy and solid aluminum oxide particles dispersed throughout into the molten matrix alloy.

FIG. 5 depicts the nature of the molten mixture 80 when it is in the mixing vessel 40, as it is transferred to the casting mold 42, and during the time that it flows within the passages of the casting mold 42. The molten mixture 80 comprises solid reinforcement particles 82 dispersed throughout the molten metallic matrix alloy 84. The solid metal oxide reinforcement particles are present in an amount of from about 5 to about 25 volume percent of the total of the molten mixture. This molten mixture may be readily cast into casting molds having intricate features to achieve complete filling of the molds.

Figure 6:
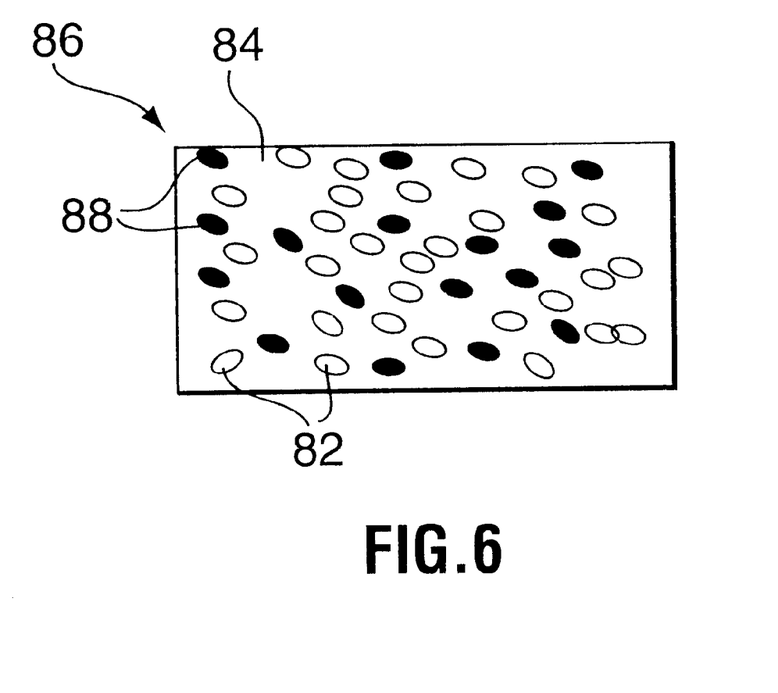
FIG. 6 is an idealized sectional view of a mixture of a solidified mixture of a solidified matrix alloy, intermetallic particles dispersed in the solidified matrix alloy, and solid aluminum oxide particles dispersed throughout the solidified matrix alloy.

After the molten mixture is transferred, numeral 30, it flows through the interior of the casting mold to its final desired location, and the molten matrix alloy eventually solidifies, step number 32 of FIG. 1. FIG. 6 depicts the microstructure of a solidified mixture 86 after solidification, which may be compared with the microstructure before solidification as shown in FIG. 5. After solidification, the microstructure of the solidified mixture 86 includes the metal oxide particles 82 dispersed throughout the matrix alloy 84, which is at this point solid. Additionally, intermetallic particles 88, crystallized during solidification of the matrix alloy are present in the matrix alloy 84. These intermetallic particles 88 may be homogeneously distributed throughout the matrix alloy, or they may be preferentially located at features of the matrix alloy such as grain boundaries.

The intermetallic particles 88 are typically less regular in shape and size than the metal oxide particles 82, but they contribute to the mechanical properties of the solidified mixture 86 which is the material of construction of the cast article such as the rotor 50. The compositions of the intermetallic particles vary according to the initial composition of the molten matrix alloy. Some examples of intermetallic particles include $Fe(Mn)Al_6$, $FeAl_3$, and $NiAl_3$, and various stoichiometries of these types.

The volume fraction of the solidified mixture 86 occupied by the intermetallic particles 88 also depends upon the composition of the initial molten matrix alloy, and may be selected according to the mechanical properties required in the final cast article. Typically, the volume fraction of the intermetallic particles 88 is from about 5 to about 20 volume percent. The total volume fraction of the solidified mixture 86 occupied by the metal oxide reinforcing particles and the intermetallic particles is from about 10 to about 40 volume percent, preferably from about 25 to about 40 volume percent.

The present invention has been practiced using the approach described above in order to conduct mechanical property measurements. Specific mixtures prepared and tested included alloys having compositions, in weight percent, of (Alloy 1) 0.8 weight percent magnesium, 0.6 percent silicon, 0.25 percent copper, 0.2 percent chromium, 2.0 percent iron, 2.5 percent manganese, 2.0 percent nickel, balance aluminum and impurities, plus 15 volume percent aluminum oxide reinforcing particles; and, for comparison, (Alloy 2) 2.0 percent magnesium, balance aluminum and impurities plus 20 volume percent aluminum oxide reinforcing particles, and (Alloy 3) 8.5 to 9.5 percent silicon, 0.45 to 0.65 percent magnesium, balance aluminum and impurities, plus 30 volume percent silicon carbide reinforcing particles.

Figure 7:
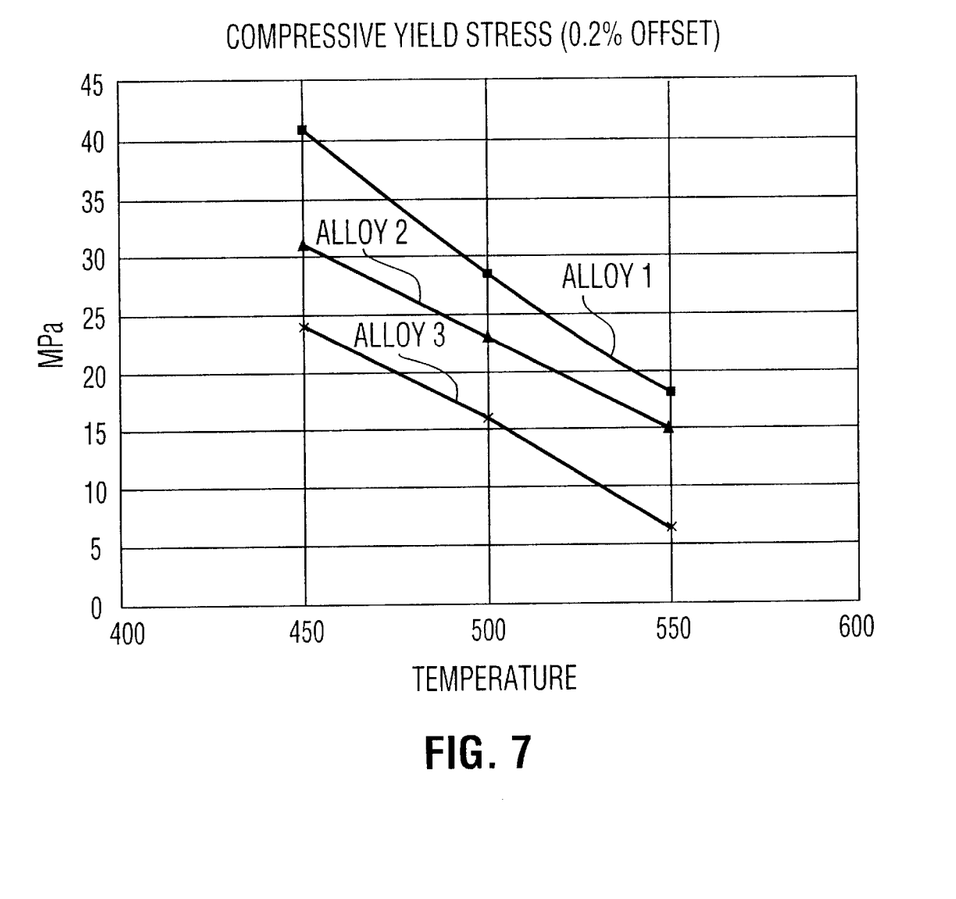
FIG. 7 is a graph of compressive yield strength as a function of temperature for three composite materials.

FIG. 7 presents the results of mechanical property tests of the compressive yield stress of these cast composite materials as a function of temperature. Alloy 1 of the present invention provides compressive stress performance superior to that of Alloy 2, which is similar to Alloy 1 but lacks the intermetallic-forming alloying elements and has a higher volume fraction of metal oxide particles. The compressive stress performance of Alloy 1 is also superior to that of Alloy 3, a silicon carbide-reinforced material having 30 volume percent of the metal oxide particles.

Full-size vented disk brake rotors like that of FIG. 3 have been cast in sand molds like that shown in FIG. 4. The rotors had a diameter of 281 millimeters and weighed about 4.5 kilograms each. The fin thickness was 5.0 millimeters. The pouring temperature of the molten mixture was about 750° C., and care was taken so that the mold was filled by the time the molten mixture had cooled to 700° C. The alloys used were Alloy 1 above, and an Alloy 4 having a composition in weight percent of 0.8 percent magnesium, 0.6 percent silicon, 0.25 percent copper, 0.2 percent chromium, 2 percent iron, 2.5 percent manganese, balance aluminum and impurities, plus 15 volume percent of aluminum oxide particles. In each case, the mold was fully filled, and the cast rotors were sound.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A metal-matrix composite material, comprising:
   a matrix having a non-hypoeutectic composition comprising
      magnesium in an amount of from about 0.3 to about 2.5 weight percent,
      an alloying element selected from the group consisting of, in weight percent, from about 0.8 to about 2.5 percent iron and from about 1.0 to about 2.5 percent manganese, and combinations thereof, and
      balance aluminum and impurities,
   the matrix having intermetallic precipitates therein which form during solidification of the matrix;
   a plurality of metal oxide particles dispersed throughout the matrix, the particles being present in an amount of more than about 5 volume percent but no more than about 25 volume percent of the total volume of the matrix and the particles, the intermetallic precipitates and the metal oxide particles together comprising more than about 25 volume percent of the total volume of the matrix and the particles.

2. The composite material of claim 1, wherein the matrix comprises less than about 1.2 percent by weight silicon.

3. The composite material of claim 1, wherein the matrix comprises less than about 0.5 percent by weight copper.

4. The composite material of claim 1, wherein the matrix comprises less than about 0.5 percent by weight zinc.

5. The composite material of claim 1, wherein the matrix further comprises from about 0.8 to about 4.0 weight percent nickel.

6. The composite material of claim 1, wherein the matrix further comprises
   an additional alloying element selected from the group consisting of more than zero but no more than about 0.3 percent vanadium, more than zero but no more than about 0.2 percent titanium, more than zero but no more than about 1.7 percent cobalt, and more than zero but no more than about 0.45 percent chromium, and combinations thereof.

7. The composite material of claim 1, wherein the matrix comprises about 1 percent magnesium, no more than about 0.6 percent silicon, no more than about 0.25 percent copper, no more than about 0.2 percent chromium, about 2 percent iron, about 2 percent manganese, and about 2 percent nickel, balance aluminum and incidental impurities.

8. The composite material of claim 1, wherein the matrix comprises about 1 percent magnesium, no more than about 0.6 percent silicon, no more than about 0.25 percent copper, no more than about 0.2 percent chromium, about 2 percent iron, and about 2.5 percent manganese, balance aluminum and incidental impurities.

9. The composite material of claim 1, wherein the composite material has substantially no silicon carbide present.

10. The composite material of claim 1, wherein the metal oxide particles comprise aluminum oxide particles.

11. The composite material of claim 1, wherein the metal oxide particles have an aspect ratio of from about 1 to about 3.

12. A cast metal-matrix composite article, comprising:
   a matrix having intermetallic particles in a cast aluminum-alloy, the matrix having a non-hypoeutectic composition comprising
      magnesium in an amount of from about 0.3 weight percent to about 2.5 weight percent, an alloying element selected from the group consisting of, in weight percent, from about 0.8 to about 2.5 percent iron and from about 1.0 to about 2.5 percent manganese, and combinations thereof, and balance aluminum and impurities;

a plurality of metal oxide particles dispersed throughout the matrix, the particles being present in an amount of more than about 5 volume percent but no more than about 25 volume percent of the total volume of the matrix and the particles. the intermetallic particles and metal oxide particles together comprising from about 25 to about 40 volume percent of the total of the matrix and the particles.

13. The article of claim 12, wherein the metal oxide particles have an aspect ratio of from about 1 to about 3.

14. A cast metal-matrix composite article, comprising:

a matrix comprising intermetallic particles in a cast aluminum alloy, the cast aluminum alloy having a non-hypoeutectic composition having a solidus temperature of at least about 630° C.; and a plurality of metal oxide particles dispersed throughout the matrix, the particles being present in an amount of more than about 5 volume percent but no more than about 25 volume percent of the total volume of the matrix and the particles, the intermetallic particles and metal oxide particles together comprising from about 25 to about 40 volume percent of the total of the matrix and the particles.

15. The article of claim 14, wherein the intermetallic particles are present in an amount such that the total of metal oxide particles and intermetallic particles is at least 25 percent by volume of the total of the matrix and the metal oxide particles.

16. The article of claim 14, wherein the aluminum alloy has a liquidus temperature of less than about 750° C.

17. The article of claim 14, wherein the article is a brake rotor.

18. The article of claim 14, wherein the article is a vented brake rotor cast as an integral hub and two plates spaced apart by a series of rib members which create air passages between the plates and the rib members.

19. The article of claim 14, wherein the metal oxide particles have an aspect ratio of from about 1 to about 3.

20. A cast metal-matrix composite article comprising a vented brake rotor cast as an integral hub and two plates spaced apart by a series of rib members which create air passages between the plates and the rib members, the vented brake rotor made of a material comprising:

a matrix comprising intermetallic particles in a cast aluminum alloy having a non-hypoeutectic composition; and a plurality of metal oxide particles dispersed throughout the matrix, the intermetallic particles and the metal oxide particles collectively being present in a total volume fraction of particles of more than about 25 volume percent but no more than about 40 volume percent of the total volume of the matrix and the total volume fraction of particles.

21. The brake rotor of claim 20, wherein the metal oxide particles have an aspect ratio of from about 1 to about 3.

22. The article of claim 20, wherein each of the members has a thickness of about 5 millimeters.

23. A metal-matrix composite material, comprising:

a matrix having a non-hypoeutectic composition comprising magnesium in an amount of from about 0.3 to about 2.5 weight percent, an alloying element selected from the group consisting of, in weight percent, from about 0.8 to about 2.5 percent iron and from about 1.0 to about 2.5 percent manganese, and combinations thereof, less than about 1.2 percent by weight silicon, and balance aluminum and impurities, the matrix having intermetallic precipitates therein which form during solidification of the matrix;

a plurality of metal oxide particles dispersed throughout the matrix, the particles being present in an amount of more than about 5 volume percent but no more than about 25 volume percent of the total volume of the matrix and the particles, the intermetallic precipitates and the metal oxide particles together comprising more than about 25 volume percent of the total volume of the matrix and the particles.

* * * * *